United States Patent [19]

Jessop

[11] 4,122,666
[45] Oct. 31, 1978

[54] CHAIN

[76] Inventor: Quenton W. Jessop, 2351 Spruce St., Carlsbad, Calif. 92008

[21] Appl. No.: 706,439

[22] Filed: Jul. 19, 1976

[51] Int. Cl.² .................................. F16G 13/18
[52] U.S. Cl. ................................... 59/80; 59/91
[58] Field of Search .................. 59/78, 80, 82, 84, 85, 59/90, 91; 63/4

[56] References Cited

U.S. PATENT DOCUMENTS

| 206,335 | 7/1878 | Kampf | 59/85 |
|---|---|---|---|
| 510,238 | 12/1893 | Breul | 59/85 |
| 1,270,916 | 7/1918 | Bailer | 59/91 |
| 1,399,646 | 12/1921 | Oppman | 59/90 |
| 2,418,552 | 4/1947 | Hasendahl | 59/78 |
| 2,805,084 | 9/1957 | Hall | 59/85 |

Primary Examiner—C.W. Lanham
Assistant Examiner—Gene P. Crosby
Attorney, Agent, or Firm—Duane C. Bowen

[57] ABSTRACT

Each chain link is punched out of a plastic sheet. The link has a closed form with a central opening and is divided on a line at one end of the opening. The link ends at the dividing line have interengaging shapes preventing separation as long as the link ends remain in the same plane. The plastic material can be flexed to spread the link laterally of the faces in joining one link to another. A slot in each link at the opposite end from its dividing line receives an adjacent link to hold the interlocking ends thereof in the same plane to thus prevent separation. The links are variously shaped to achieve different decorative effects.

18 Claims, 17 Drawing Figures

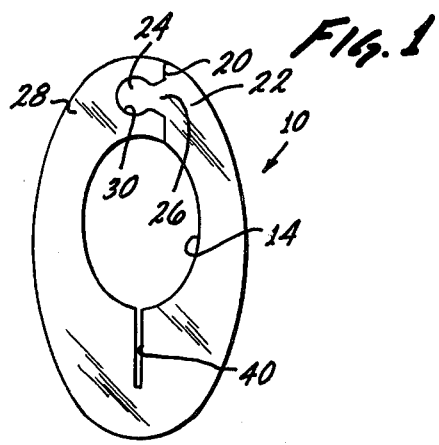
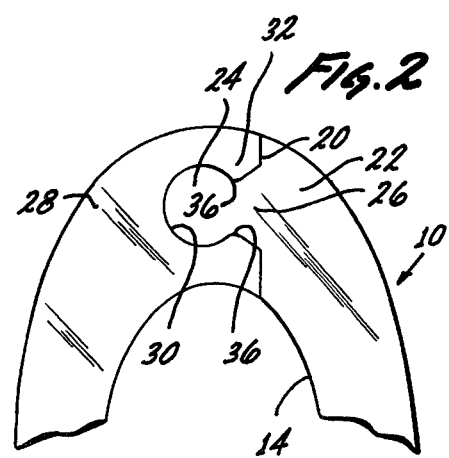
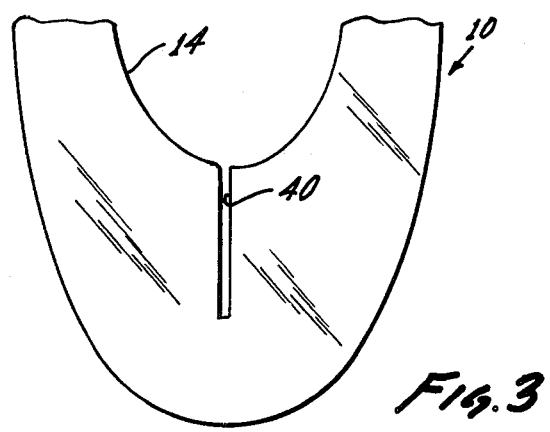
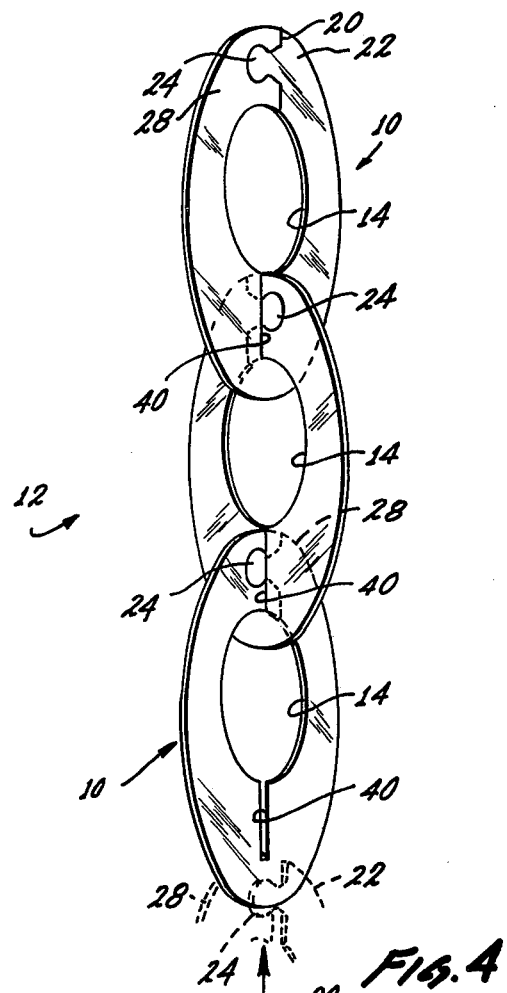
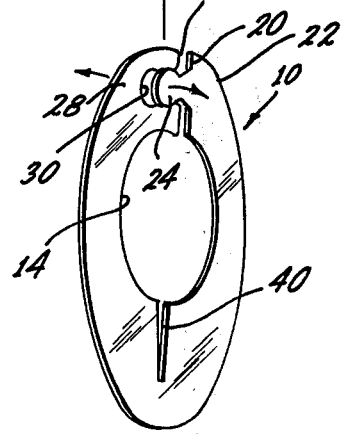

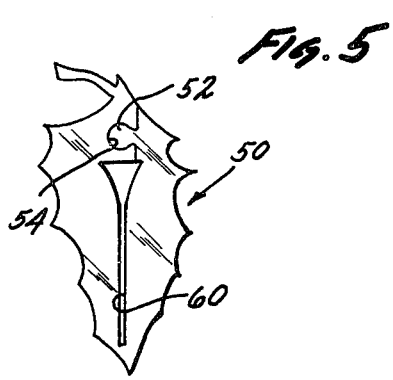
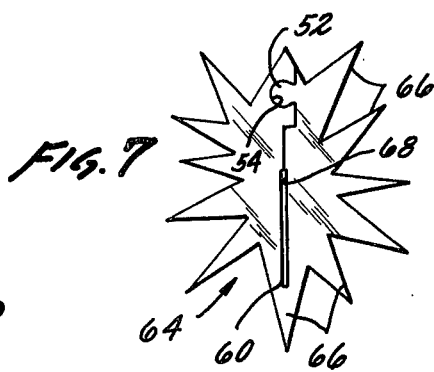
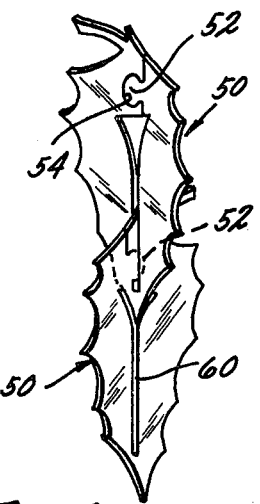
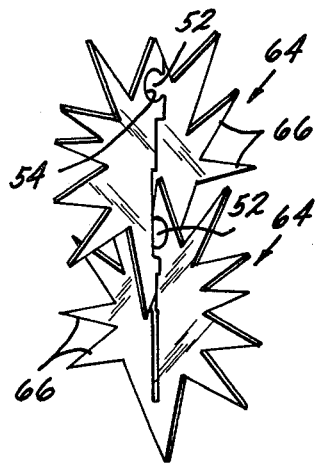
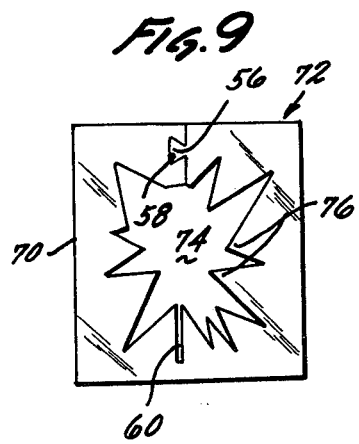
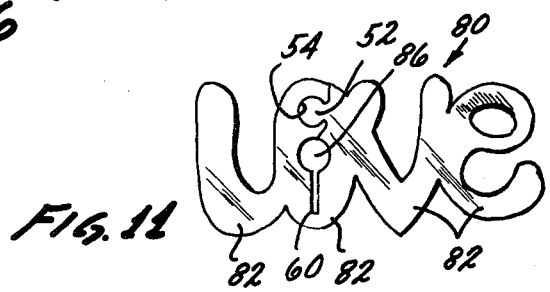
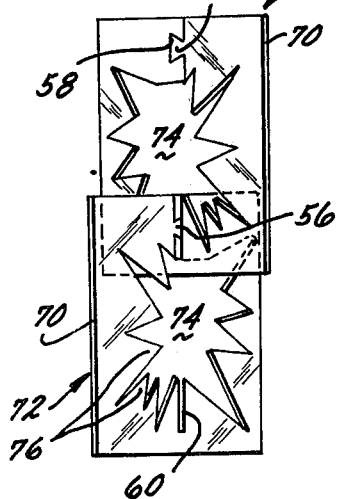

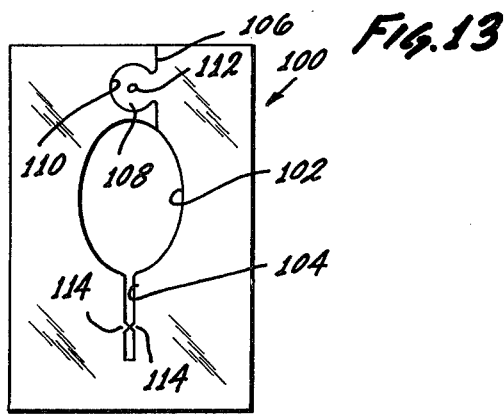
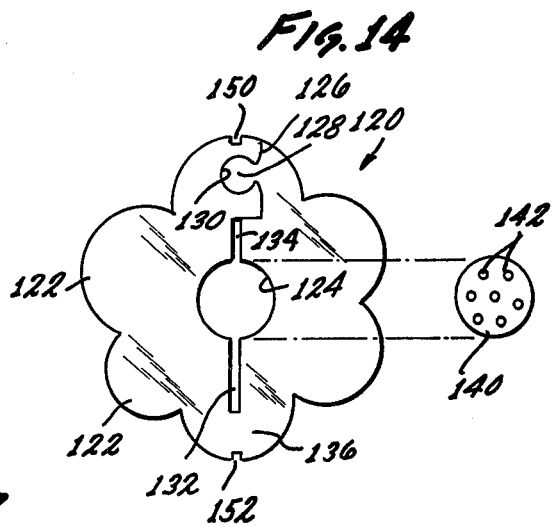
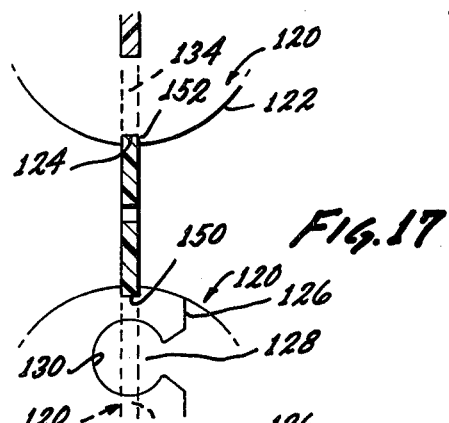
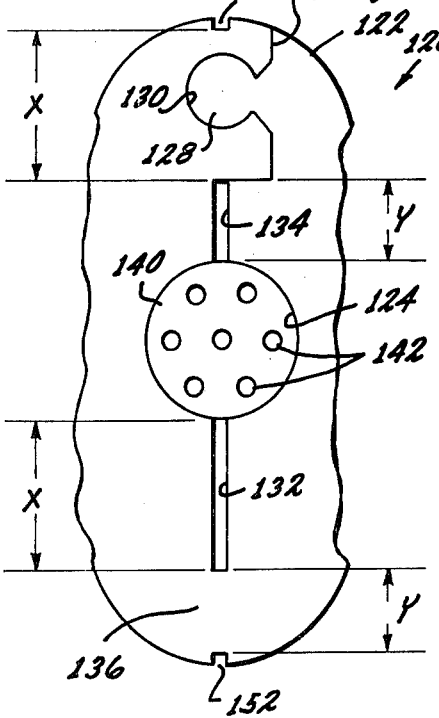
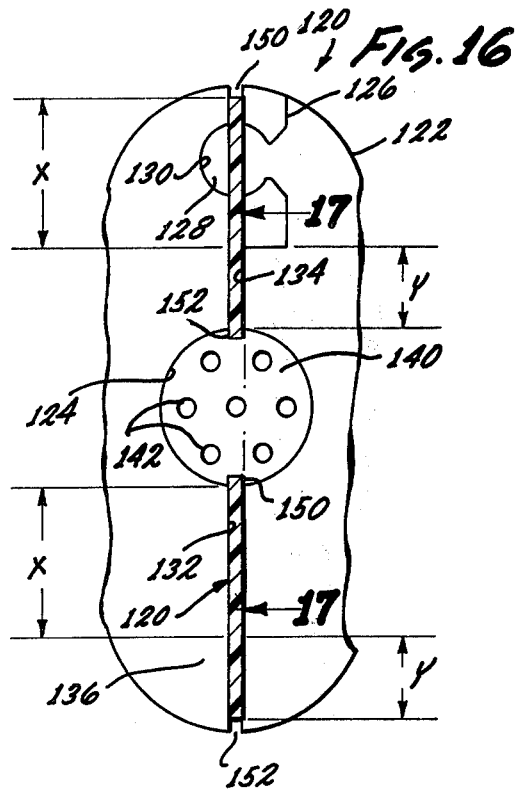

CHAIN

BRIEF SUMMARY OF THE INVENTION

My invention relates to providing a new economical and decorative chain for light duty as contrasted to heavy duty chain.

My invention arose out of several different sources. One was in design efforts relating to hanging objects like flower buckets, aquariums, terrariums, etc., which led to the observation that chains for such purposes were limited in ornamental effects. Another source was interest in plastics as to their potentials in producing new products. The various sources of thought were brought together with the concept of punching out of plastic chain links. It became evident that links needed to be divided for feasible assembly and that interlocking ends (as opposed, say, to bonding) were needed at the time of division as a means of rejoinder in order to not reduce chain strength excessively, by the dividing action, for many applications. Part of the concept of interlocking chain ends was the feasibility of flexing the plastics material making up the link laterally of the link faces to engage and disengage the interlocking structure. Noting that the interlocking action was only effective if the link ends remained engaged, I further devised a slotted structure to retain the interlocked chain ends in their normal interlocked plane. At the same time I was working on the above concepts, part of my thinking involved the various decorative shapes that could be punched out of plastic or the like as chain links.

The objectives of my invention include: to form chain links out of plastic or like materials and particularly by punching or cutting operations and to achieve various decorative link forms; to provide light duty chain links of low cost; to improve on the appearance of chains; to solve the problem of assembly of links punched out of plastic or the like; to avoid excessive strength loss by providing interlocking link ends at lines of division used for assembly purposes; and to provide means to hold the interlocked link ends in their normal interlocked plane.

The objectives of my invention together with additional advantages and objectives thereof, will be best understood from the following description read with reference to the drawings, in which:

FIG. 1 is a face view of a specific embodiment of a link of my new chain.

FIG. 2 is an enlarged partial view of one end of the link of FIG. 1.

FIG. 3 is an enlarged partial view of the other end of the link of FIG. 1.

FIG. 4 is a perspective view of a chain assembled from links of the type viewed in FIG. 1. In the lower part of FIG. 4, the dashed lines and the separated link indicate the spreading of a link in the process of assembly.

FIG. 5 is a face view of a modified link, having a leaf shape.

FIG. 6 is a perspective view of two links of the FIG. 5 construction joined together.

FIG. 7 is a face view of another modified link, having its outer border formed with a series of spaced outwardly radially projecting extensions therearound forming a decorative border.

FIG. 8 is a perspective view of two links of the FIG. 7 construction joined together.

FIG. 9 is a face view of another modified link, having its inner border formed with a series of spaced inwardly radially projecting extensions forming a decorative center.

FIG. 10 is a perspective view of two links of the FIG. 9 construction joined together.

FIG. 11 is a face view of another modified link, having a series of connected letters spelling a word, in which one letter forms the portion of the link having the link opening.

FIG. 12 is a perspective view of two links of the FIG. 11 construction joined together.

FIG. 13 is a face view of another modified link, differing as to interlocking means.

FIG. 14 is a face view of another modified form, differing as to interlocking means and as to a center member shown in exploded position.

FIG. 15 is an enlarged partial face view of the link shown in FIG. 14 and showing the center member in place for informational purposes, although normally the center member is installed during link assembly.

FIG. 16 is like FIG. 15 only showing the interlocking of the center member by adjacent links.

FIG. 17 shows details in the section 17—17 of FIG. 16.

FIGS. 1-4 show details of a link 10 and of a chain 12 formed from such links. Preferably links 10 are formed by being punched out of a thin sheet of plastic material. A suitable thickness is 0.030 inch. Chain links 10 can be of various dimensions but one suitable size would be 2½ inches for the major axis and 1 7/16 inch for the minor axis. Styrene is one of the suitable plastic materials which is available at low cost and with suitable properties of strength, etc.

Links 10 can be punched from a plastic sheet with a small punch press with a rating of 200-300 strokes per minute such as a Benchmaster press (Benchmaster Manufacturing Company, 1835 W. Rosecrans Avenue, Gardena, Calif.). use of a three stage die is not unlikely (first punching out the central opening or aperture, second punching out the interlocking tongue and groove and the slot, and third punching out the external boundary of the link). Plastic sheet may be of roll stock, i.e., 3 inches, 12 inches, 24 inches, etc., and automatic feeding can be used. Although styrene is abrasive, a die could have as long life as 10 million pieces. The die should be a precision type die of tool steel. The point of the foregoing is not to dictate manufacturing processes and equipment but rather the point is that links can be produced with low manufacturing costs in terms of material costs, production rates, etc., with moderately priced equipment.

Link 10 is preferably of uniform thickness with flat faces and is of a closed form shape. The outer boundary in FIGS. 1-4 is curvedly annular or, more specifically, oval. Although the central opening 14 could be merely an elongated aperture and still have the same functions, it is shown as being oblong and oval and somewhat similar in shape to the outer boundary of link 10. Note, however, that one end of link 10 (the lower end as viewed) is wider than the other end, for reasons that will become understood.

One necessary property of a chain is joinder of links. Each link 10 is divided or split on a line 20. If link 10 were merely split on one side, joinder of adjacent links would thus be accommodated but the strength of the chain links would depend on the strength of the unsevered side and the ability of the link ends to maintain their shape with support on only one side.

I bridge the line of division with interlocking means which is shown as having the form of a tongue and groove structure in which line 20 is shaped to form one link end 22 as a tongue 24 necked at 26 and to form the other link end 28 with a mating groove 30 broadened inside its mouth 32. This means that as long as link ends 22, 28 stay in the same plane, there would have to be a material failure in order for tongue 24 to become disengaged from groove 30. This means that link 10, although not having as much strength as an unsplit link, has more strength than a link that is split and has no interlocking means at the ends bordering the line of division. Preferably line 20 at the mouth 32 of groove 30 (and the neck 26 of tongue 24) is slightly rounded at 36 rather than being at an abrupt angle as such an abrupt angle would be more subject to material failure (a rip from that point) than a more rounded line. A tongue and groove is a good interlocking structure feasible to manufacture by punching with a die on a line having the form shown for line 20. Other interlocking forms could be used in which, analytically, there is some doubling back of line 20 as it passes from inner to outer link border.

The material forming link 10 has to be somewhat flexible in order to form links 10 which have tongue and groove or like interlocking ends 22, 28. As shown at the bottom in FIG. 4, link ends 22, 28 are spread laterally of the faces of the link to disengage tongue 24 from groove 30 so that they can pass the lower portion of the adjacent link as viewed and be joined again in the opening 14 of the adjacent link. The dashed line in FIG. 4 demonstrates this action.

With the structure thus far described, links 10 may be joined into a chain 12 and the links have good strength as long as link ends 22, 28 remain in the same plane. If the material used to form the links had some built-in stress, link ends 22, 28 might tend to move out of a common plane. Also, under sufficient force tongue 22 could tend to come out of groove 30. Theoretically, that would not occur if their geometrical forms were perfect, but manufacturing processes do not have such perfection. That is not to say that much camming displacement would necessarily occur under force, as instead the tongue and groove could jam tightly against escape until material failure occurred.

I guard against link ends 22, 28 moving out of a common plane, with the structure shown, to the extent that becomes important in preventing tongue and groove unlocking whether due to warping of material or an application where the chain is subject to sufficient force to cause displacement on occasion by camming action. Securing of link ends 22, 28 in a common plane is accomplished in the structure shown by a slot 40 at the end of the link opposite to line 20. Slot 40 preferably has the same width and length as the other end of link 10 at line 20, although obviously the structure would work with some deviations even beyond manufacturing tolerances. The walls of slot 40 (which is open to central opening 14) abut the sides of link ends 22, 28 at line 20 to hold link ends 22, 28 at line 20 thereby preserving tongue and groove engagement against moving out of a common plane, for whatever reason, and preserving the strength potential of the tongue and groove link ends interlocking. When it is stated that slot 40 receives the opposite link end "at line 20" this means at some appropriate plane medial of the tongue and groove structure, such as approximately the plane of groove 32 and tongue neck 26.

In FIGS. 1-4 each link is curvedly annular and each opening 14 is oval. In FIGS. 5-10 the links have other configurations that achieve various decorative effects. In the past, variations in chain designs as to decorative effects have been relatively limited, perhaps because of the limitations of the methods and materials of fabrication such as shaping from rod shapes or by casting. I realized by cutting chain links out of sheet or strip stock that a relatively wide variety of shapes could be fabricated and at a low cost. FIGS. 5-10 show some principal variations in design which maintain the same functional parts and functional characteristics as the FIGS. 1-4 version but achieve considerably different aesthetic characteristics.

FIGS. 5 and 6 show links 50 of shapes representaive of leafs. Interlocking tongues and grooves 52, 54 follow closely the FIGS. 1-4 construction in all of the FIGS. 5-12 variations except FIGS. 9 and 10 have tongues and grooves 56, 58 that are angular rather than curved. All of the variations in FIGS. 5-12 have end slots 60 similar to slot 40 in FIGS. 1-4, although their central openings are variously shaped, some being essentially slot shaped and others having different shapes. The function of end slots 60 in each case is the same as in FIGS. 1-4, to receive the opposite end of the link, in the area of the tongue and groove, of the next adjacent link.

The effect of joined links 50 of the FIGS. 5-6 leaves shapes gives a natural appearance perhaps somewhat like leaves on a twig, or leaves in a garland, a wreath or foliage in general. In this case, use of green material would be understandably appropriate. FIGS. 7 and 8 instead have links 64 with a series of spaced outwardly radially projecting extensions 66 therearound forming a decorative border. When it is said that the extensions 66 radially project, this is not meant to mean that they are exactly symmetrical to radiuses from some center but instead the expression is meant to mean that the extensions 66 extend outwardly in some manner, whether geometrically regularly like a star shape or irregularly geometrically in which spacings of ends are uneven, directions are varied and edges are not necessarily straight. In a sense, the FIGS. 7 to 8 construction is opposite to the FIGS. 9 to 10 construction in which the decorative elements extend inwardly. The central opening 68 in the FIGS. 7 to 8 construction is not oval as in the case of the central opening 14 in the FIGS. 1-4 construction but instead central opening 68 is in the form of a slot. In fact, opening 68 is not much distinguished from slot 60 and primarily means that link 64 is divided on a line starting with the cut line forming tongue 52 and groove 54 and continuing to meet slot 60 so that each link can be spread apart in joinder of adjacent links and a tongue and groove portion of one link can be positioned in the slotted portion of the next adjacent link.

In the FIGS. 9-10 construction, the outer border 70 of links 72 can be rectangular or curved and the interior opening 74 has a series of spaced inwardly radially projecting extensions 76 forming a decorative center. Like in the FIGS. 7-8 construction, extensions 76 are not necessarily geometrically radial to a given center but instead just generally inwardly project, and they may be irregularly spaced and formed and may have straight or curved walls. On the other hand, they can have geometrical definition, such as a star shape, etc.

In the FIGS. 11-12 construction, the links 80 are formed by a series of connected letters 82, which in the drawings spell "love". One of the letters (or possibly an area bordering between two letters, depending on how the lettering is designed) has the functional elements including tongue 52, groove 54, slot 60 and a central opening 86. It should be noted again, not only in connection with this embodiment but also generally, that when the claims define a central opening that this can be a spaced opening or may be merely a slit such as in FIGS. 7 and 8 that connects the line forming tongue 52 and groove 54 with the opposite end slot 60 as that is the functional necessity of the so-called "central opening" and that function can be variously supplied as demonstrated by the various configurations shown in the drawings. To restate this, if in the FIG. 1 construction there were no end slot 40, then central opening 14 connecting with line 20 forming the tongue and groove would have the function not only of link division and spreading to join to another link but also would be the receptacle for the wall of the adjacent link. However, when an end slot 40 is provided, central opening 14 no longer has to receive the wall of the adjacent link when links are joined, as this is a function provided by slot 40. For this reason, in the FIG. 7 construction the central opening is indistinguishable from slot 60 or the line dividing the link to form tongue 52 and groove 54 in the central portion of link 64, and anything more than a connection between line 20 and slot 40 in FIG. 1 is a decorative feature.

The configuration in FIG. 13 is with a rectangular shaped link 100, i.e., the exterior border is rectangular, and with an oval inner opening 102. The slot 104 shown at the bottom is of a length to receive the top tongue and groove portion of the adjacent link 100. The tongue and groove structure shown in FIG. 13 is much like that in the other figures, i.e., the line of division 106 forming a rounded tongue 108 and a matching groove 110. Another feature has been added, however, which is an opening 112 in tongue 108 and detent means in slot 104. Although detent means could be provided in the form of a lug from one slot wall, the preferred form shown are V-shaped detents 114 from opposite walls of slot 104 that may actually meet in the center, i.e., in cutting the link in effect the material is separated by a line at the apexes of the detents. This means that when links 100 are assembled that detents 114 are caught in opening 112 which tends to hold the links in assembled, extended positions, as against collapse, meaning that the tongue and groove end of one link will not come out of the slot 104 in the adjacent link during assembly or later handling.

FIG. 14 may be said to have a daisy exterior shape in its link 120, i.e., a series of petal shapes 122 around a circular center 124. The line of separation 126 of the upper end of link 120 as shown forms a tongue 128 and a groove 130 like in the other figures, and the opposite groove 132 in the bottom wall as viewed likewise follows structure previously discussed. Added is an upper slot 134 open to center 124 which receives the bottom portion 136 of the next adjacent link, which, hence, tends to hold the links in an aligned series.

The circular material 140 cut to form center 124 is not thrown away necessarily in the link construction 120. It might be termed the daisy center and may have a series of circular punchouts 142 to resemble anthers. It is preferred to have to have two colors, i.e., some links 120 could be punched from white material and some from yellow material with the yellow centers 140 fitting in white links 120 and vice versa.

Circular members 140 are not merely decorative, as they are used to secure adjacent links against collapse or disengagement. In effect, members 140 are reinserted (or inserted in another like but differently colored link) to hold the tongue and groove end structure in slot 132 of an adjacent link and portion 136 in slot 134 of an adjacent link. This may be seen to be a desirable object but how can center circular members 140 be secured in place? This is accomplished by notches 150, 152 in opposite exterior edges of link 120 and by control of the dimensions labeled "x" and "y" in FIGS. 15 and 16. Note that the width of the tongue and groove portion in FIG. 15 without the depth of notch 150 is equal to the depth of slot 132 (both having the same "x" length or width) and, hence, when they are assembled the notch 150 borders the sides of the center 124. Likewise, the width of lower portion 136 less the depth of notch 152 is equal to the length of slot 134 (both length "y") so that when adjacent links are assembled the sides of notch 152 borders the sides of center 124. When the links are properly positioned, with link parts in slots 132 and 134, then center member 140 can be snapped into place within opening 124 and with diametrically opposite points engaged in notches 150 and 152 (at points indicated at 160 and 162 in FIG. 15). Note that the condition shown in FIG. 15 does not exist during assembly, i.e., the adjacent links 120 are assembled and then the circular or other shaped center is snapped into place.

Having thus described my invention, I do not wish to be understood as limiting myself to the exact details of construction shown. Instead I wish to cover those modifications thereof that will occur to those skilled in the art upon learning of my invention and which properly fall within the scope thereof.

I claim:

1. The improvement in a chain having a series of interlocking links, comprising:
   (a) each link being of uniform thickness and having flat faces and being formed from a thin, uniform-thickness sheet of plastic material,
   (b) said link having a closed form shape defining a central opening and being divided on a line extending from the central opening to the outer boundary of the link, said plastic material forming said link having sufficient flexibility so that said link can be joined to another by spreading open said link on said line in a direction lateral of said faces of said link,
   (c) said line having a shape defining interlocking link ends at said line preventing spreading apart of said link ends at said line in a direction lateral of said line in the plane of said link, whereby said link ends remain locked as long as said link ends remain in the same plane and as long as there is no material failure, and
   (d) said opening being oblong and said link having said line at a first end thereof and having at the second end thereof a slot open to said opening and extending part way toward the outer boundary of said link and of a size to match the cross-sectional width and thickness of said first end at said line, first and second adjoining links in said chain being connected with said first end of the first link received in the slot at the second end of said second link with the walls of that slot holding interlocking link ends in a common plane thereby preventing separation thereof.

2. The subject matter of claim 1 in which said interlocking link ends have the forms of a tongue and groove with the groove being broadened inside its mouth and with the tongue necked at the mouth of the groove whereby the tongue and groove forms interlock.

3. The improvement in a chain having a series of interlocking links, comprising:
   (a) said link having a closed form shape defining a central opening and being divided on a line extending from the central opening to the outer boundary of the link, the material forming said link having sufficient flexibility so that said link can be joined to another by spreading open said link on said line in a direction lateral of the faces of said link,
   (b) said line having a shape defining interlocking link ends at said line preventing spreading apart of said link ends at said line in a direction lateral of said line in the plane of said link, whereby said link ends remain locked as long as said link ends remain in the same plane and as long as there is no material failure, and
   (c) said link having said line at a first end thereof and having at the second end thereof a slot open to said opening and extending part way toward the outer boundary of said link and of a size to match the cross-sectional thickness of said first end at said line, first and second adjoining links in said chain being connected with said first end of the first link received in the slot at the second end of said second link with the walls of that slot holding interlocking link ends in a common plane thereby preventing separation thereof.

4. The subject matter of claim 3 in which said interlocking link ends have the forms of a tongue and groove with the groove being broadened inside its mouth and with the tongue necked at the mouth of the groove whereby the tongue and groove forms interlock.

5. The subject matter of claim 3 in which each link is curvedly annular and in which said opening is oval.

6. The subject matter of claim 3 in which each link has a leaf shape.

7. The subject matter of claim 3 in which each link has a series of connected letters spelling a word and one letter forms the portion of the link having said opening.

8. The subject matter of claim 3 in which each link has its outer border formed with a series of spaced outwardly radially projecting extensions therearound forming a decorative border.

9. The subject matter of claim 3 in which each link has the inner border thereof forming said openings formed with a series of spaced inwardly radially projecting extensions forming a decorative center.

10. The improvement in a chain having a series of interlocking links, comprising:
    (a) said link having a closed form shape and being divided on a line extending from an outer boundard of the link to the central portion, said line having a shape defining interlocking link ends at said line preventing spreading apart of said link ends at said line in a direction lateral of said line in the plane of said link, whereby said link ends remain locked as long as said link ends remain in the same plane and as long as there is no material failure, and
    (b) said link having said line at a first end thereof and having in the opposite end thereof a slot of a size to match the cross-sectional width and thickness of said first end at said line, first and second adjoining links in said chain being connected with said first end of the first link received in the slot at the second end of said second link with the walls of that slot holding interlocking link ends in a common plane thereby preventing separation thereof, each link being cut in a manner joining said line and said slot in order to permit an adjacent link portion to be inserted between spread interlocking link ends and into said slot.

11. The subject matter of claim 10 in which said interlocking link ends include a tongue and a groove interfitting against separation and said tongue having an opening therein and said slot having detent means extending laterally thereof and positioned to fit in the opening in the tongue of the next adjacent like unit thereby to hold links against collapse by the action of the detent means in the opening in the tongue.

12. The subject matter of claim 11 in which said detent means have the form of a pair of V-shaped detents aligned on opposite inside walls of said slot.

13. The subject matter of claim 10 in which there is a central opening in said link and said first-mentioned slot opening to said central opening and there being a second slot opposite to said first-mentioned slot also opening to said central opening, said second slot receiving the portion of the next adjacent link from the first-mentioned slot to the nearest link edge.

14. The subject matter of claim 13 in which the link edge nearest to each slot at diametrically opposite ends of said link each has a notch and the depths of said slots accommodate the widths of the link portions inserted therein except for the depth of said notches so that when adjacent links are assembled the sides of said notches border the sides of said central opening and there being a central member of a size to fit said central opening positioned therein and retained by said notches.

15. The improvement in a chain having a series of interlocking links, comprising:
    (a) each link having at one end thereof a slot of a size to match the cross-sectional thickness of the other end of said link, and
    (b) first and second adjoining links in said chain being connected with said other end of the first link received in the slot at said one end of said second link with the walls of that slot holding said other end of said first link against dislodgement.

16. The subject matter of claim 15 in which said other end of said first link has an opening therein and said slot in said second link having detent means extending laterally thereof and positioned to fit in said opening in said first link thereby to hold links against collapse by the action of said detent means in said opening.

17. The improvement in a chain having a series of interlocking links, comprising:
    (a) each link having a central opening and having first and second diametrically opposite ends which have respectively first and second slots leading from said central opening, said slots having sizes to match the cross-sectional thickness of the other ends of said links, and
    (b) first and second adjoining links in said chain being connected with said first end of said second link received in said second slot of said first link and with said second end of said first link received in said first slot of said second link.

18. The subject matter of claim 17 in which each link has a notch at each end, the depths of said slots accommodating the widths of the link portions inserted therein except for the depth of said notches so that when adjacent links are assembled the walls of said notches border the sides of said central openings and there being a central member of a size to fit each central opening positioned therein and retained by said notches.

* * * * *